United States Patent
Hjelt et al.

(10) Patent No.: US 7,350,424 B2
(45) Date of Patent: Apr. 1, 2008

(54) ACCELERATION SENSOR

(75) Inventors: Kari Hjelt, Espoo (FI); Tapani Ryhanen, Helsinki (FI); Samuli Silanto, Helsinki (FI); Jukka Salminen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/502,454

(22) PCT Filed: Feb. 6, 2003

(86) PCT No.: PCT/FI03/00095

§ 371 (c)(1),
(2), (4) Date: May 23, 2005

(87) PCT Pub. No.: WO03/069355

PCT Pub. Date: Aug. 21, 2003

(65) Prior Publication Data

US 2005/0252308 A1 Nov. 17, 2005

(30) Foreign Application Priority Data

Feb. 12, 2002 (FI) .................................. 20020284

(51) Int. Cl.
*G01P 15/06* (2006.01)
*G01P 15/12* (2006.01)

(52) U.S. Cl. ..................... 73/862.041; 73/862.043; 73/862.632; 73/862.637; 73/514.33; 73/514.34; 200/61.08

(58) Field of Classification Search ........... 73/862.041, 73/862.043, 862.046, 862.632, 862.634, 73/862.636, 862.637, 862.639, 862.68, 514.32–514.33, 73/514.01, 514.34, 514.36; 200/61.08
See application file for complete search history.

(56) References Cited

U.S. PATENT DOCUMENTS

| 4,641,539 A | 2/1987 | Vilimek ..................... 73/862 |
| 4,645,564 A | 2/1987 | Morie et al. ............... 156/643 |
| 4,745,564 A | 5/1988 | Tennes et al. ............. 364/566 |

(Continued)

FOREIGN PATENT DOCUMENTS

EP 0 261 555 9/1987

(Continued)

OTHER PUBLICATIONS

Patent Abstract of Japan, JP 01163673, Jun. 27, 1989.*
Patent Abstracts of Japan, Publication No. 10-010151.

*Primary Examiner*—Edward Lefkowitz
*Assistant Examiner*—Punam Patel
(74) *Attorney, Agent, or Firm*—Perman & Green, LLP

(57) ABSTRACT

A low-cost breakable inertial threshold sensor using mainly micro-machining silicon technology constructed on a silicon-wafer or on some other brittle material according to the MEMS process. The sensor comprises a first body portion, a second body portion, and detecting means for giving an indication if the second body portion has damaged the detecting means. The status of the sensor can be read in various ways. In one embodiment the status is remotely readable.

29 Claims, 11 Drawing Sheets

U.S. PATENT DOCUMENTS

| | | | |
|---|---|---|---|
| 5,095,762 A * | 3/1992 | Holm-Kennedy et al. | 73/862.041 |
| 5,747,353 A * | 5/1998 | Bashir et al. | 438/50 |
| 6,122,965 A * | 9/2000 | Seidel et al. | 73/514.36 |
| 6,272,901 B1 | 8/2001 | Takeuchi et al. | 73/12.01 |

FOREIGN PATENT DOCUMENTS

| | | |
|---|---|---|
| EP | 1 109 378 A2 | 6/2001 |
| JP | 62036561 | 2/1982 |
| JP | 2000180463 | 6/2000 |
| WO | WO 97/30356 * | 8/1997 |
| WO | WO 98/09174 | 3/1998 |
| WO | WO 01/61362 A1 | 8/2001 |

* cited by examiner

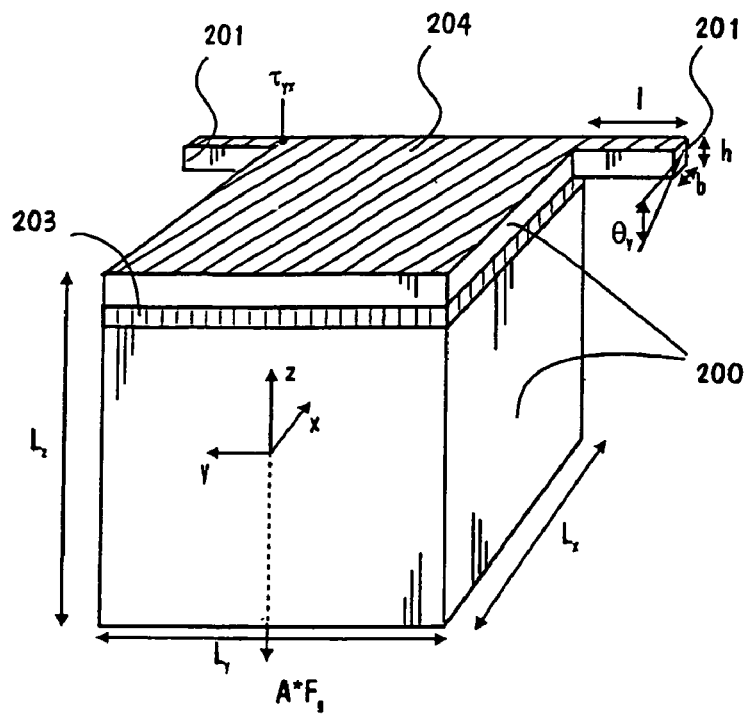
FIG. 2
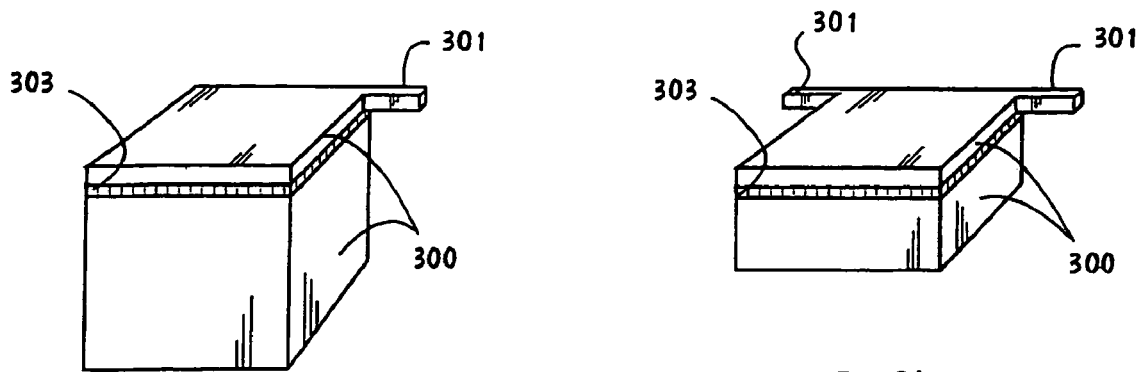
FIG. 3b
FIG. 3a
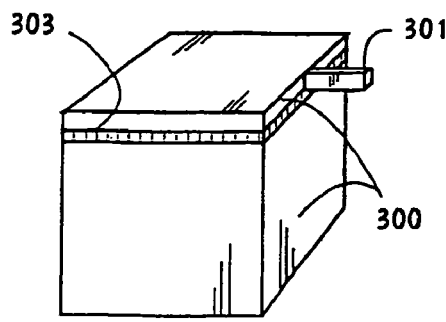
FIG. 3c

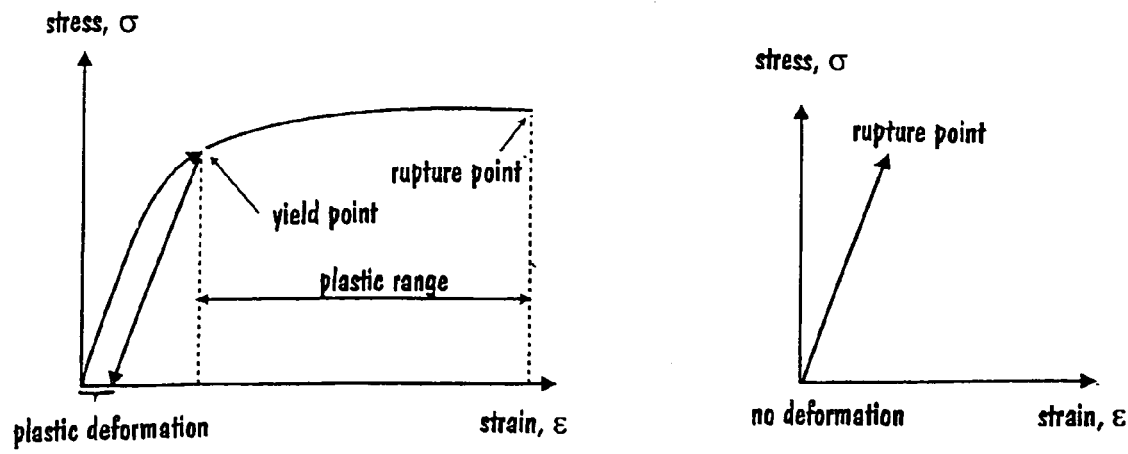
FIG. 4a    FIG. 4b
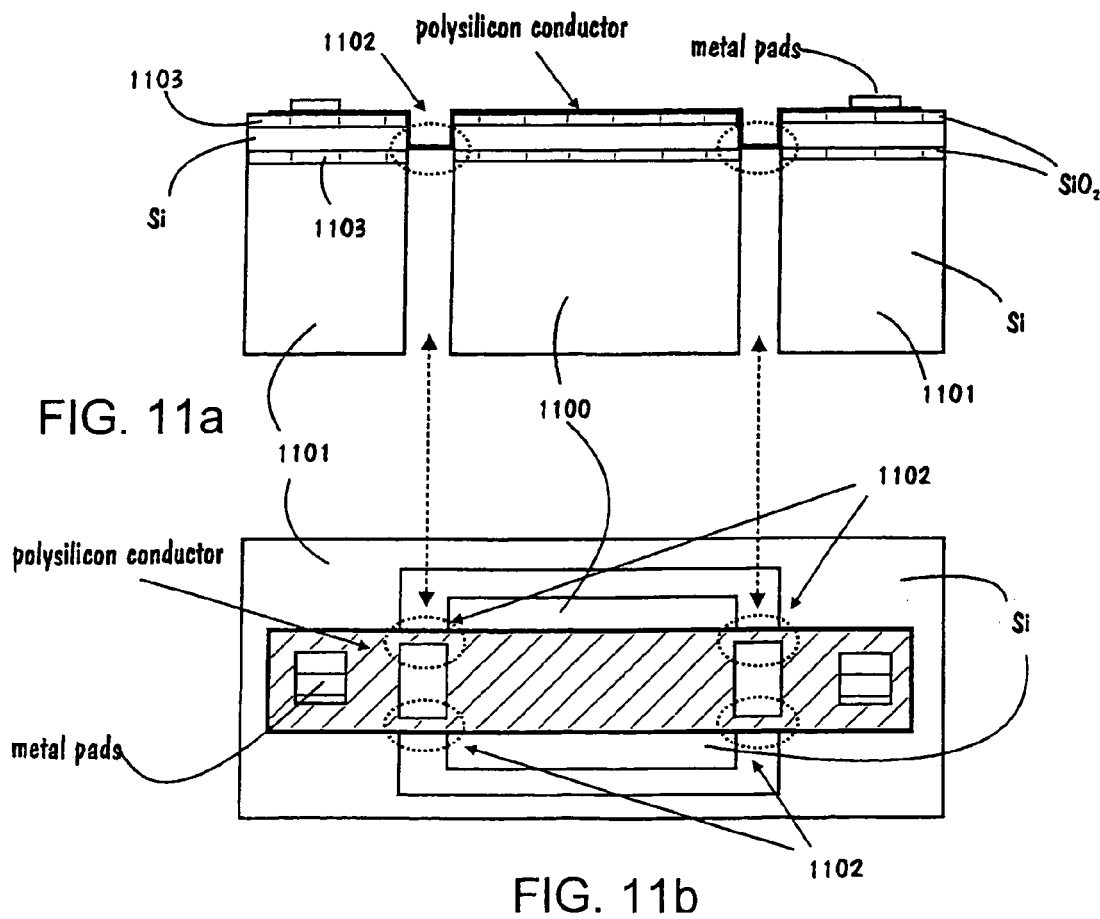
FIG. 11a
FIG. 11b

ACCELERATION SENSOR

This application is the National Stage of International Application No. PCT/FI03/00095, International Filing Date, Feb. 6, 2003, which designated the United States of America, and which international application was published under PCT Article 21(2) as WO Publication No. WO 03/069355 A1, which claims priority to Finnish Patent Application FI 20020234 filed Feb. 12, 2002.

FIELD OF THE INVENTION

The present invention relates generally to micro-electromechanical systems (MEMS) and in particular to the structure and operation of a micro-mechanical acceleration sensor.

BACKGROUND OF THE INVENTION

There is a growing trend toward smaller and smaller components for electrical applications. Thus micro-electromechanical (MEM) systems and microsystems technology (MST) have made rapid progress in recent years. MEMS/MST technology has the advantages of reliability, small size, low weight and low cost. MEMS is probably best known for its sensor and actuator applications.

The substrate material most used in the production of micro-electronic circuitry is silicon (Si). Among other suitable materials used are silicon dioxide ($SiO_2$), silicon nitride (SiN), polycrystalline silicon, and quartz.

FIG. 1a is an explosion view of a prior-art acceleration sensor based on the inertia of a silicon proof mass. The acceleration sensor has a multilayer structure comprising silicon layers 101, 111, 121 and glass insulator layers 102 and 122, of which the former is located between silicon layers 101 and 111 and the latter between silicon layers 111 and 121. The structure further comprises two stationary capacitor plates, of which the first plate (not shown in the figure) is between a glass insulator layer 102 and a silicon layer 111 and the second plate 124 is between the silicon layer 111 and a glass insulator layer 122. Silicon proof mass 104 is fastened to the frame 111 via two elastic silicon springs 105. Between the proof mass and each glass insulator there is typically a one-micrometer space.

When the acceleration sensor is subjected to acceleration, elastic springs 105 balance the inertia of the proof mass by bending. The relatively small displacement of the inertial mass is measured by comparing the capacitance formed by the second plate 124 and the proof mass with the capacitance formed by the first plate and the proof mass. The electrical connections needed for said comparison are formed by metal films 103, 113, and 123 arranged on corresponding outer surfaces of each of the silicon layers.

An accelerometer such as the one depicted in FIG. 1a can easily be constructed to measure the desired acceleration range. However, drawbacks are that it is expensive to manufacture and requires complicated measurement electronics needing a power supply.

FIG. 1b depicts a top view of a prior art latching accelerometer that mechanically records shocks without needing a power supply. Such a latching accelerometer can be used as a peak-reading shock recorder typically covering the range from 60 g to 3500 g (g is acceleration of gravity). The main parts of the accelerometer are a pedestal 151, a flexible cantilever 153 with one end fixed to the pedestal, an inertial mass 152 in the middle of the cantilever, and a number of notches 154-158 forming an arc. Movement of the cantilever is prevented by dose glass and/or silicon surfaces (159 and 160) on either side of the cantilever in the plane parallel to the paper.

When the accelerometer is subjected to acceleration the inertial mass deflects the cantilever tip 158. Depending on the amount of acceleration the tip moves from one notch to another. For example, if the original position of the tip is between notches 155 and 156, it may move to between notches 154 and 155 or alternatively to between notches 156 and 157.

The spring force of the elastic cantilever (dimensions are typically: length 1 mm and thickness 5 μm) is not strong enough to return the tip to the original position. Additional stops 161 and 162 can be arranged that allow incremental thresholds to be recorded.

Although this accelerometer is adequate for many purposes, typically as indicators of rough handling in shipping operations according to an editorial article in Electronic Design Magazine of Jun. 23, 1997, pp. 28-31, the mechanically latching accelerometer has several drawbacks. Due to friction the acceleration threshold is hard to control precisely, and variation between individual units is high. Additionally, the inertial mass indicates acceleration in one plane only.

Most of the MEMS accelerometers developed are based on an inertial proof mass, which acts on a spring or springs, and the deflection from the idle position is measured. For example, a capacitive circuit element can be made to change capacitance depending on this deflection. Automobile airbag accelerometers typically use this measurement method and have been developed into reliable mass-produced low-cost devices.

Micromechanical lateral field emitters arranged on bending cantilevers are used in some acceleration sensors. In such sensors the strength of current is based on the bending of the cantilever, which deflects lateral field emitters from opposing each other. The acceleration sensor needs supporting electronics in both said prior-art cases. However, this increases the production costs, which is not acceptable in many cases.

Prior-art acceleration sensors are generally discrete devices where the sensor and the measurement electronics are implemented on separate chips. Lately some surface micromachined acceleration sensors have been devised, where the sensor and the measurement electronics are implemented on a single semiconductor chip. Such sensors are generally packaged in single chip modules (SCM) or multichip modules (MCM) featuring both the sensor and the measurement electronics in the same package.

One drawback is that at the moment there is no such sensor commercially available, suitable for mass-produced handheld terminals, such as electronic books, with the capability to register or warn when the terminal has suffered an acceleration shock. Additionally, no method is provided for remote reading in the prior-art sensors, or for time registering shock events.

Normal practice is that companies provide a warranty for products such as electronic equipments. If any faults or defects are found during a warranty period, the customer has the right to claim either repair or replacement of the faulty equipment free of charge. However, there is no method to find out whether the customer has handled the electronic device too roughly or whether the device was already damaged when received. Usually the product itself does not in any way inform either the user or the repairman of mishandling if no visible physical damage can be found. Unnecessary warranty repairs in consequence of mishandling are common today due to the fact that the cause of breakage or damage is untraceable. From the manufacturers' and dealers' point of view this is frustrating and often very uneconomical. Mishandling could be minimized if the product in one way or another warned the user of rough usage which could damage the product.

Furthermore, illegitimate warranty claims could be avoided if the product itself could indicate abusive handling. Mishandling of lent equipment could also be avoided if the borrower knows that any mishandling can be ascertained when the equipment is returned.

SUMMARY OF THE INVENTION

An objective is to implement a low-cost breakable inertial threshold sensor using mainly micro-machining silicon technology. Other objectives are that the sensor is suitable for mass production, small in size and surface mountable, with the possibility to register acceleration threshold levels. The sensor can be used to check if a device such as a mobile terminal has suffered a drop or any other acceleration shock. At the moment there is no suitable sensor available for this kind of purpose.

A sensor is constructed on a silicon wafer or on some other brittle material according to the MEMS process. The sensor is constructed from a first body portion, a second body portion, an interconnecting element making the first body integral with the second body, and detecting means for giving an indication if the second body portion damages the detection means.

In one embodiment of the invention the sensor comprises at least one inertial mass with at least one tiny breakable cantilever such as a bracket, beam, or bar one end of which is connected to the inertial mass and the other end to a supporting frame. The size of the cantilever is quite small in comparison with the inertial mass. When the sensor is accelerated the inertial mass causes stress on the cantilever resulting in its rupture at a certain stress level.

Information about the breaking sensor can be measured by means of change of electrical impedance, for example. The sensor may be covered at least partly with some conductive material that breaks along with the cantilever or the movement of the inertial mass may break the conductive path. Other means to detect a broken cantilever is to measure the response of the inertial mass to actuation by mechanical or electro-magnetical means. Since the broken device response is different from the unbroken one, capacitive reading can be applied. The preferred method is however to measure the conductance.

The breakage of the conductive path, with the time of occurrence and the direction of the acceleration, can be recorded and read either actively or passively depending on the solution used. Several sensors responding to a different force may be implemented in the same product. The status of the sensor is readable either directly or from a memory. There are various alternatives for reading the status of the sensor such as self-test reading, online reading or remote reading. Even if the amount of interconnections within the sensor group are minimized, the status of the sensors of a sensor group can simultaneously be read when it is being ascertained whether one or more sensors are broken.

BRIEF DESCRIPTION OF THE DRAWINGS

The invention is described more closely with reference to the accompanying drawings, in which FIG. 2 illustrates an example of the basic structure of the inertial mass of the sensor, FIG. 3a-c illustrates some examples of the basic structure of the inertial mass of the sensor, FIG. 4a is a typical strain-stress graph for polycrystalline materials and metals, FIG. 4b is a typical strain-stress graph for single crystal materials such as single crystal silicon, FIG. 11a-b illustrates an example of an acceleration sensor processed using both bulk-mechanic and surface micro-mechanic technologies.

DETAILED DESCRIPTION OF THE PREFERRED EMBODIMENT

Figure 1A:
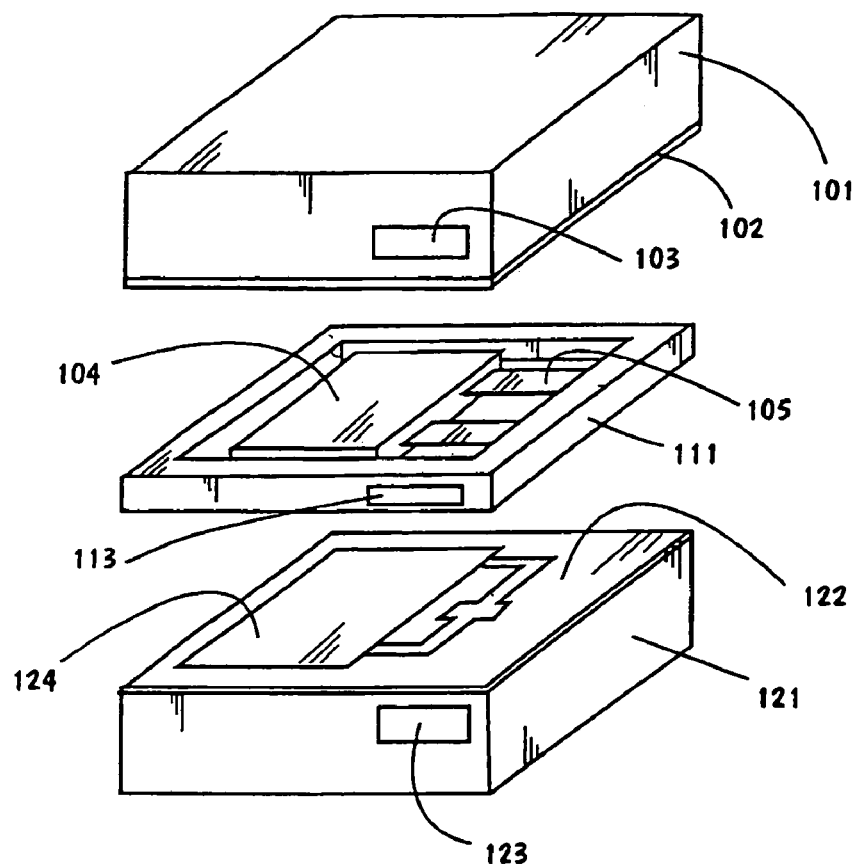
FIG. 1a illustrates an example of a prior art acceleration sensor.
Figure 1B:
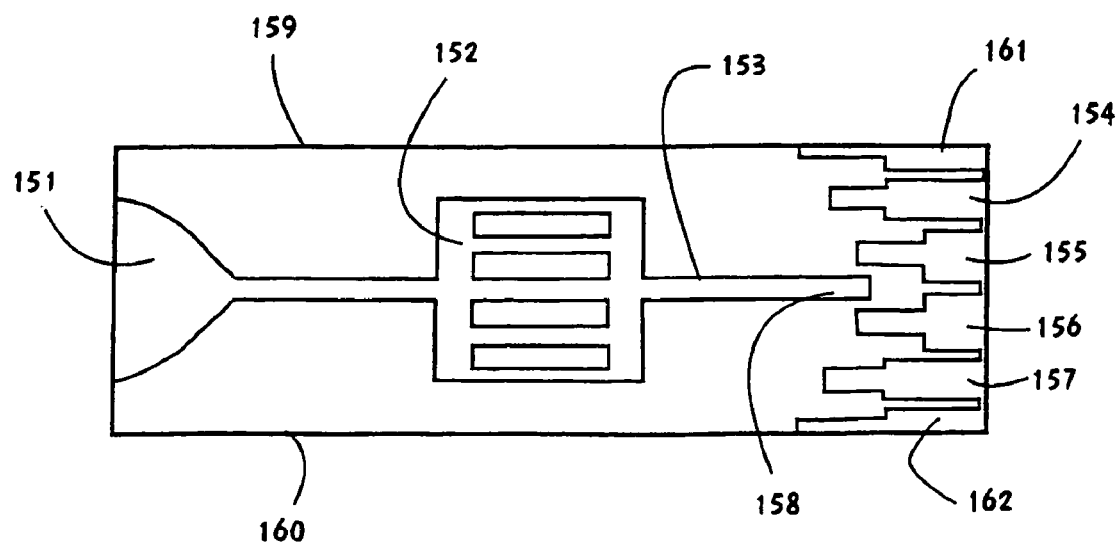
FIG. 1b illustrates an example of a mechanically latching prior art accelerometer.

A small breakable inertial threshold sensor according to the invention may be used for checking if a product or a device such as a mobile terminal has suffered a drop or other acceleration shock. The operation of the sensor is based on the simple fact that when the sensor is accelerated the sensor inertial mass which is connected to a support frame by at least one tiny beam, will oppose the movement. When the opposing inertial force is great enough, the beam will break.

In the following the small breakable inertial threshold sensor produced by micromachining technology is considered in more detail by way of examples in FIG. 2-11. It is to be noted that the relative dimensions of the components shown in the figures may vary in reality. The inertial threshold sensor is hereinafter called an acceleration sensor or shortly a sensor.

First the inertial mass with at least one cantilever beam apart from a supporting frame is considered in detail.

FIG. 2 illustrates an example of the basic structure of an inertial mass of the sensor. The structure is cubical comprising two tiny cantilever beams 201 symmetrically at the opposite corners on the same edge of the cubical mass. The inertial mass is a few hundred micrometers thick and made of commercially available Silicon On Insulator (SOI), which is a composite structure consisting of two silicon layers 200 with a thin insulating layer (e.g. silicon oxide $SiO_2$) 203 between them. In this example, the top silicon layer is covered with a conductive material 204 which also covers the top layer of the cantilever beams as shown in FIG. 2. Examples of other insulators include silicon nitride and an insulating form of silicon. The conductive layer can be polycrystalline silicon, metal, or any other suitable breakable conductive material.

One end of the cantilever beam is connected to the inertial mass and the other end to a frame (not shown in FIG. 2). The cantilever beam is quite small in comparison to the inertial mass. Thus, should a sufficient external accelerating force be applied to the sensor, the acceleration induces movement of the inertial mass causing stress on the cantilever beams to rupture at least one of them and simultaneously to break of the conductive path. Information about the breaking sensor fuse can be measured by means of a change of path impedance in the conductive part, for example.

The inertial mass of the sensor determines its response to an accelerating force. For example, the structure in FIG. 2 is the most sensitive for forces acting on it from the direction parallel to the z-axis and less sensitive to forces acting on it from the direction parallel to the y-axis. Strictly speaking the z-component of the torque T is greater than the x- and y-components.

In general the rigid body has three degrees of freedom in relation to translation, one in each direction parallel to the axis of the coordinates. Similarly it has three degrees of freedom in relation to rotation, one around each axis of the coordinates. In order for the body to be in equilibrium, the sum of all forces acting on it must be zero, as well as the sum of all torques.

The sensitivity of the sensor can be adjusted to the required level by changing the cantilever and/or mass dimensions. The sensitivity of the sensor depends also on the location of the cantilever beams, as well as their shape. Further, the number of cantilever beams has an effect on the sensitivity. The rupture point of the cantilever beam can be calculated and adjusted by altering the parameters: length l, width b, and thickness h of the cantilever beam and dimensions of the inertial mass.

FIG. 3a-3c illustrates some examples of the basic structures of the inertial mass of the sensor. Though the inertial mass with cantilever beams is shown in the figures apart from the frame, it is to be noted that they can all be etched on a SOI wafer (this will be studied later in greater detail) so that the interface between the cantilever beams and the frame is unbroken.

The sensor according to the invention comprises an inertial mass, at least one breakable cantilever beam, and a frame supporting the inertial mass from one end of said cantilever beam. The cantilever beam is located preferably in a corner on the edge of the inertial mass as shown in FIGS. 3a, and 3b. However, depending on requirements the cantilever beam(s) may be located anywhere in the inertial mass (FIG. 3c), symmetrically or asymmetrically. Of course, the required acceleration threshold level determines the size, the shape, and the weight of the inertial mass used, as well as the number and location of cantilever beams 301. The acceleration threshold level can be from 500 g to 10000 g, where g is the acceleration of gravity. For example, if a body is released from rest at a height of one meter and its stopping distance is one millimeter, the deceleration applied to the body is about 1000 g. It is to be noted that the threshold level limits mentioned above are only guidelines.

Assume that in FIG. 3a-3c the inertial mass of the sensor is made of commercially available Silicon On Insulator (SOI), which is a composite structure consisting of two silicon layers 300 and an insulating layer 303. The insulating layer, however, is not necessarily required in the manufacturing process, i.e. when the inertial mass is etched the insulating layer merely facilitates the processing. At least part of the outer surface of the sensor is covered with some breakable conductive material (not shown in FIG. 3). As described above the cantilever beam will break if an acceleration being applied to the sensor is great enough to tilt the inertial mass. In other words, when the tilt angle θ of the inertial mass increases, also the sheer stress σ in the cantilever beam and the internal mass increases, resulting in the rupture of the structure (see FIG. 2).

A plurality of small-size, low-cost acceleration sensors oriented in different directions can be constructed according to the MEM process on one and the same silicon wafer. Though the best wafer material is single crystal silicon, other breakable materials can also come into question, such as silicon dioxide ($SiO_2$), silicon nitride (SiN), polycrystalline silicon, quartz, sapphire, or the construction of such materials primarily in a form of sandwich structure. Thus, any suitable brittle material can be used.

FIG. 4a illustrates a typical stress-strain curve for polycrystalline materials and 4b for a single crystal material such as single crystal silicon. FIG. 4a shows that after the yield point the material plastically elongates until it ruptures, the stress level remaining relatively constant. A deformed shape of the material remains when elongates stress applied to it is released. FIG. 4b shows that when the elongated stress is released the single crystal material returns to its original shape, i.e. no deformation nor hysteresis is found. The rupture point shows where the material ruptures. Strain ϵ is defined by $$\epsilon = \Delta L / L,$$

where L represents the length of the body and ΔL is the change in the length.

Advantages which make silicon the best material for the sensor manufactured according to the MEM process are that silicon is economical, ruptures without deformation, is simple to produce in small size (area about 1 $mm^2$), and suitable for mass production.

Silicon is a nonmetallic element that is abundantly available. It has a diamond crystal lattice. Especially single crystal silicon is recommended because its rupture points are easily predictable from crystal structure. However, this does not restrict the use of amorphous silicon (not crystalline on any significant scale), which is much less expensive material than single crystal silicon.

The process used enables the manufacturing of three dimensional acceleration sensors using surface acceleration sensors on the same silicon wafer.

Electrochemical etching is one of the techniques used for depositing and patterning the surface of the silicon wafer. Two different etching techniques are proposed to remove material: wet and dry etching. The simplest structures that can be formed on the silicon wafer are V shaped grooves or holes with right-angled corners and sloping walls.

Figure 5:
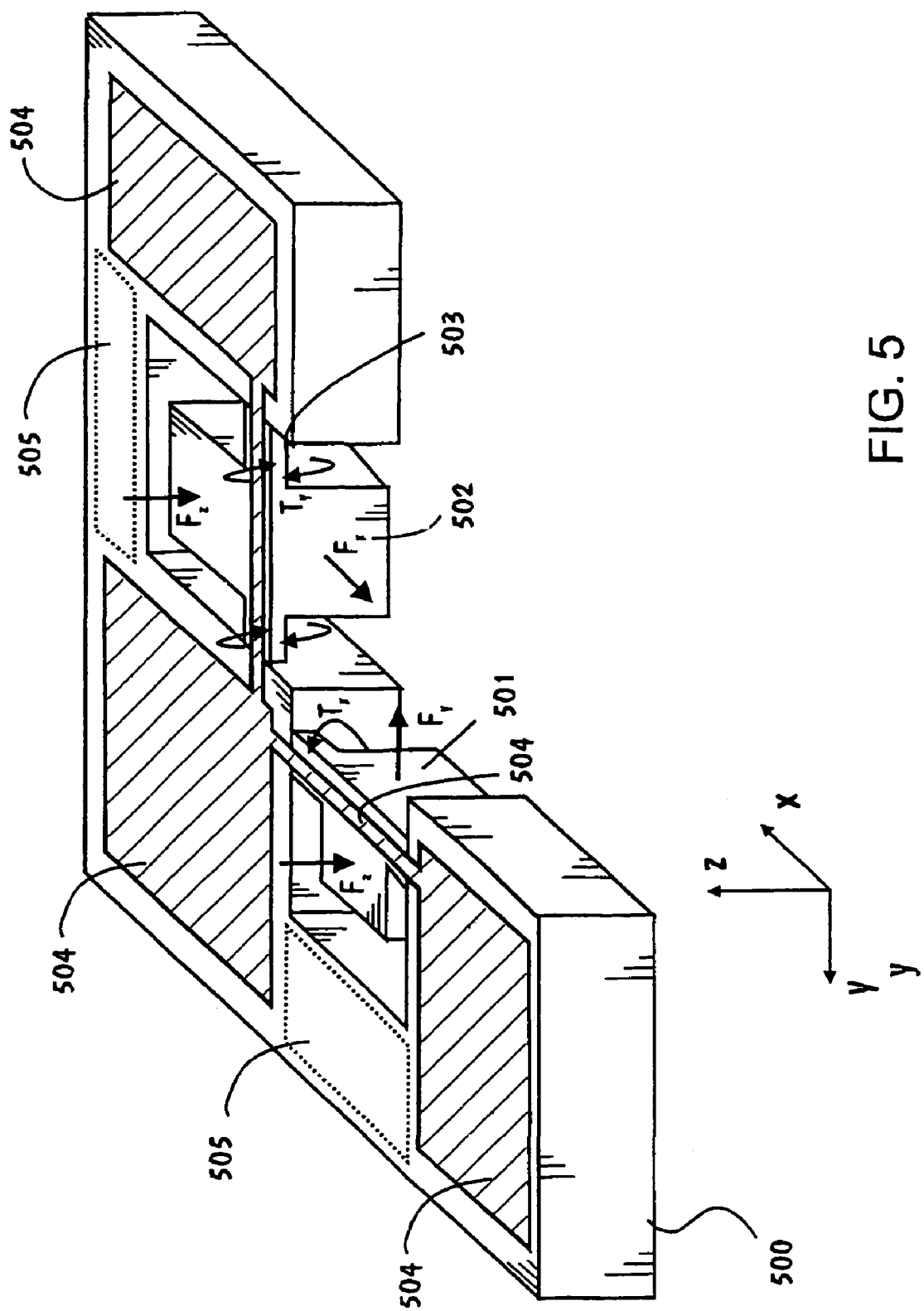
FIG. 5 illustrates one example of a structure including more than one inertial mass etched on the same chip.

FIG. 5 illustrates one example of a structure including more than one inertial mass etched on the same chip. In this example the structure micromachined on a silicon wafer has the shape of an L-letter and is comprised of a frame 500 and two cubical inertial masses 501 and 502, each of which have two tiny cantilever beams 503 symmetrically at the opposite corners on the same edge of the inertial mass. At least part of the said structure is covered with a conductive layer 504.

Both of the arms of the L-structure have a cavity with right-angled corners and straight walls. One inertial mass is in each cavity. One end of the cantilever beam is connected to the inertial mass and the other end to the wall of the cavity. The cantilever beams of the inertial mass 501 are in parallel direction with the x-axis and the cantilever beams of the inertial mass 502 are in the direction parallel with the y-axis as shown in FIG. 5. As stated above, the relative dimensions of the components shown in the figure may vary in reality. For example, the cantilever beams are very tiny in comparison with the inertial mass. The interface between the cantilever beam and the frame, as well as the interface between the cantilever beam and the inertial mass, is unbroken because the said structure is etched on the same chip. Of course, depending on the material used and the size of the structure, the cantilever beam can also be a separate part that is connected in some suitable way to the inertial mass and the frame.

At least part of the structure is covered with breakable conductive material 504. The shape and the location of it is not restricted providing that the conductive material is arranged in such a way that it breaks when the cantilever breaks. According to FIG. 5 an area 505 of the frame top surface is reserved for electronic circuitry.

Generally, the sensitivity of the structure is increased proportionally to the number of inertial masses it has with different acceleration threshold levels and tilting directions. The invention includes several ways of implementing the presented inertial masses by orienting them in different ways. For example, in some of the ways six inertial masses can be arranged to form a hexagonal structure or three inertial masses can be oriented in such a way that the second inertial mass is turned 45 degrees in respect to the first inertial mass and the third is turned 45 degrees in respect to the second.

Figure 6:
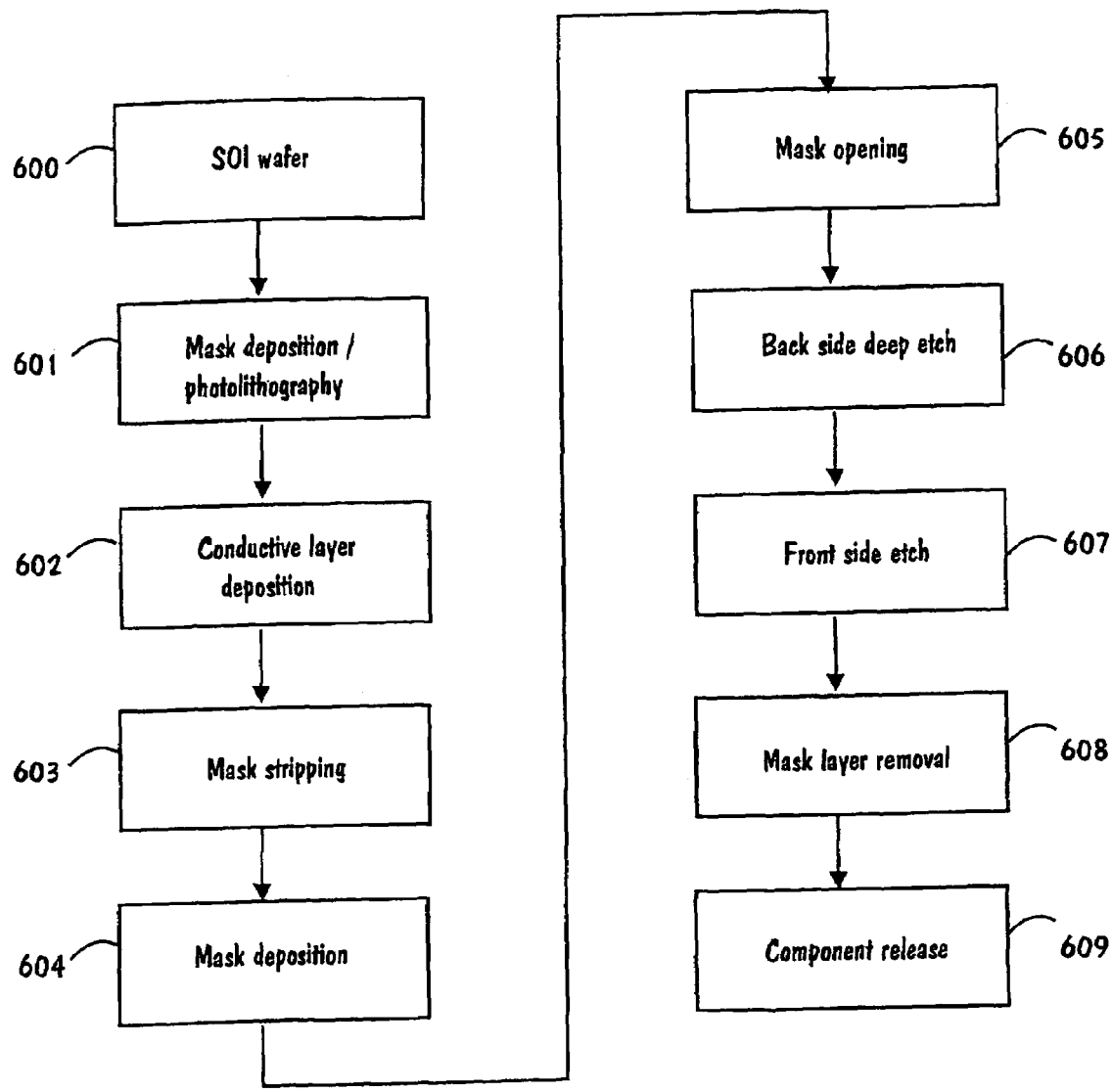
FIG. 6 illustrates a process flow to produce the micromechanical inertial sensor.

FIG. 6 shows a flow diagram of an exemplary fabrication method for the inertial sensor.

A SOI wafer 600 is used in the manufacturing process described. First, a mask layer is deposited on the wafer with spin casting or according to other methods at stage 601. Mask is then developed with photolithography to form open areas for the conductive path. After mask development the conductive layer is deposited over the wafer at stage 602. The mask layer is then removed from the wafer and the conductive path has been formed on the wafer, stage 603.

At the next process stage 604 mask layers for the deep etching are deposited on both sides of the wafer. The mask openings for the deep etching are processed at stage 605. The inertial mass is then formed from the handle layer of the wafer with deep etching from the back side of the wafer at process stage 606. The cantilever beams are formed from the device layer of the wafer with etching from the front side of the wafer at stage 607. Before releasing the device, the mask layers are removed from the back and front sides of the wafer at process stage 608. Finally, at stage 609 the device is released by etching the insulator from open areas where it holds the inertial mass.

Figure 7A:
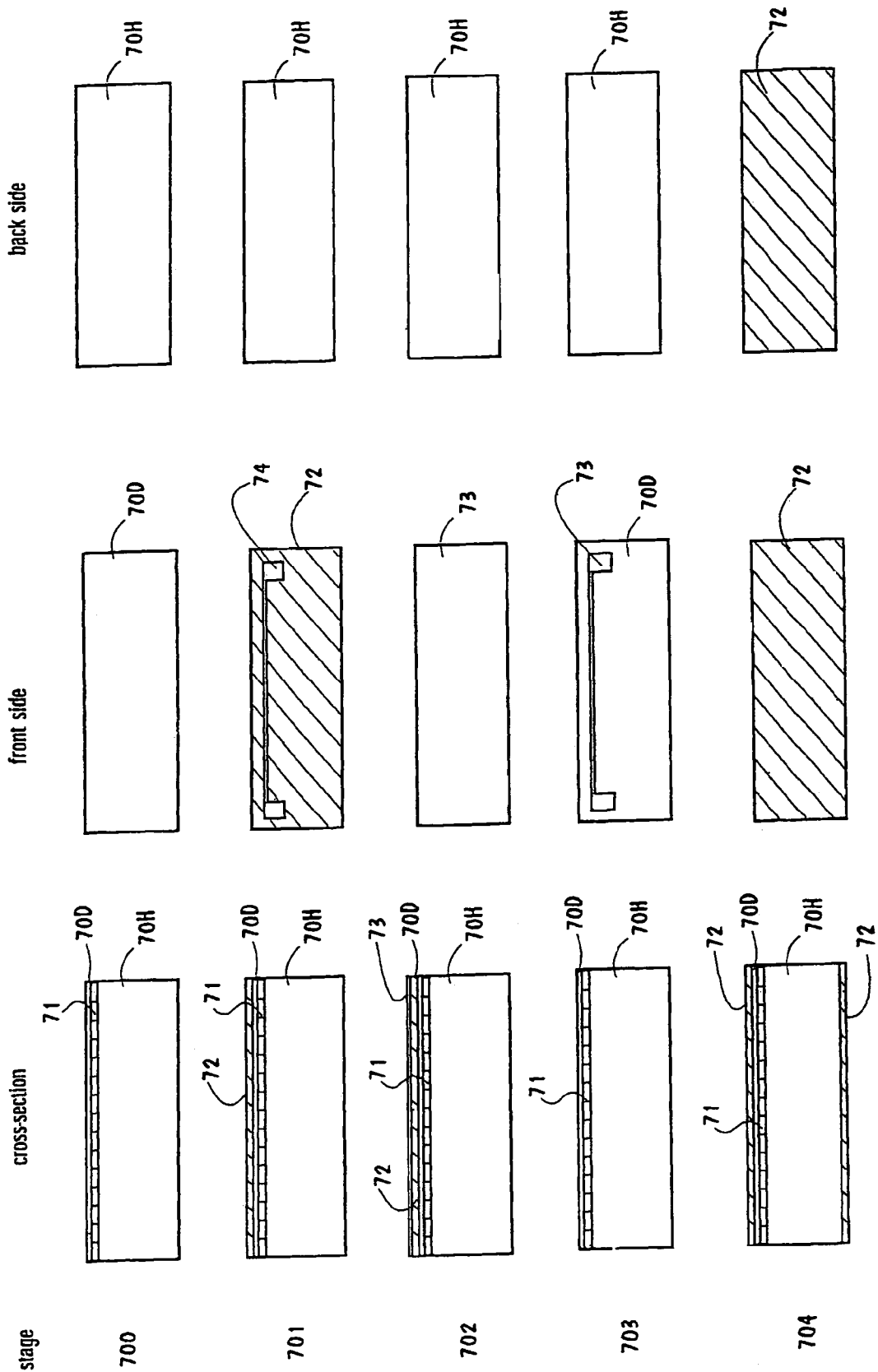
FIG. 7a-b illustrates a cross section, top, and front-side views of the production sample according to the process flow.
Figure 7B:
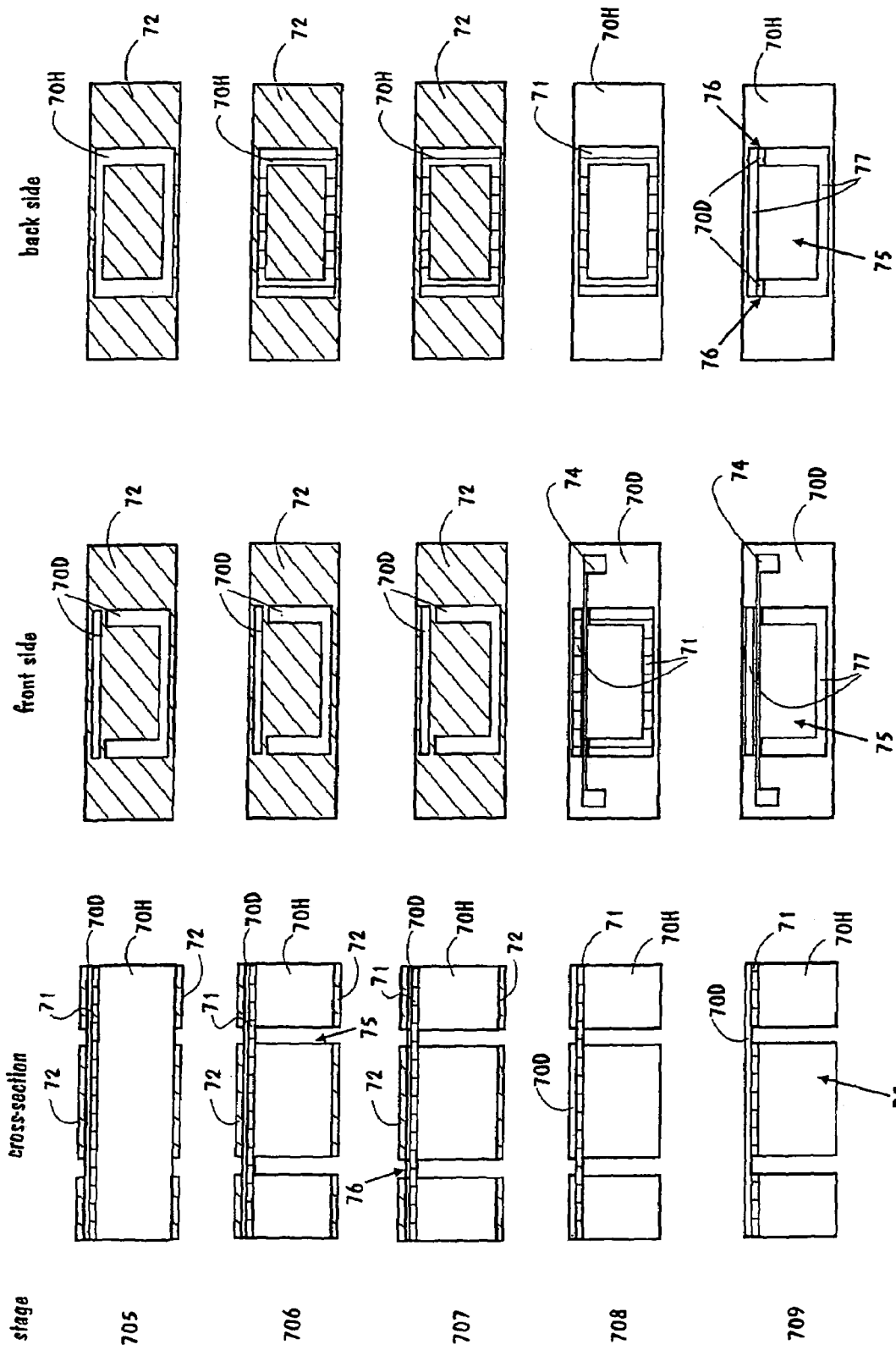

FIG. 7a-b shows a cross section, the front side and the back side of the SOI wafer after each process phase. The process flow stages 700-709 in FIG. 7a-b correspond to the process stages 600-609 in FIG. 6 and are described in more detail in the following.

The SOI wafer consists of two silicon layers 70D and 70H (a device layer and a handle layer), and an insulator layer (SiO) 71 at stage 700. The mask layer 72 is deposited on the silicon layer 70D. At stage 701 an open area 74 for the conductive path is seen in the front side figure. The (noble) metal 73 is then evaporated (or deposited in any other suitable way) on the mask layer 72 (at stage 702) so that when the mask layer is removed at stage 703 a pattern consisting of the evaporated metal 73 remains on the wafer surface 70D. At the next stage 704 a mask layer 72 is deposited on both silicon layers, i.e. on layer 70D and layer 70H. The first layer 70H is deeply etched (stage 706) to form the inertial mass 75. Then layer 70D is etched to form two cantilever beams 76 at stage 707. Removal of material is performed by a dry etching technique such as reactive ion etching, which is the most common form of dry etching for micromachining applications. Now the device is formed from the SOI wafer and is held with the insulator layer 71 between the handle and device layers, i.e. layers 70H and 70D. The mask layers 72 are removed (stage 708), and the insulator layer 71 is etched away from the open areas 77 at stage 709.

Figure 8A:
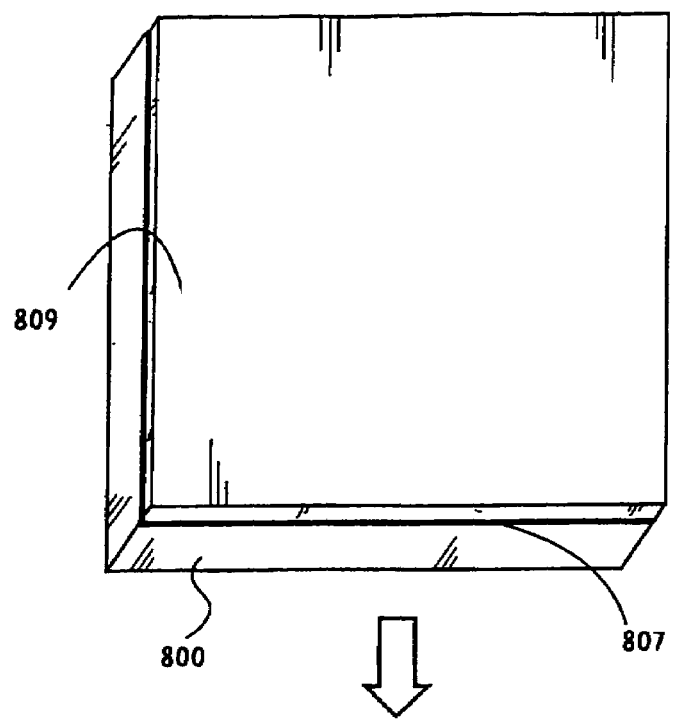
FIG. 8a-c shows one example of a breakable acceleration sensor.

FIG. 8 shows one example of the breakable acceleration sensor. In FIG. 8a there is a Silicon On Insulator (SOI) as seen from above, consisting of two silicon layers 800 and 809 and a silicon oxide layer 807 between them.

Figure 8B:
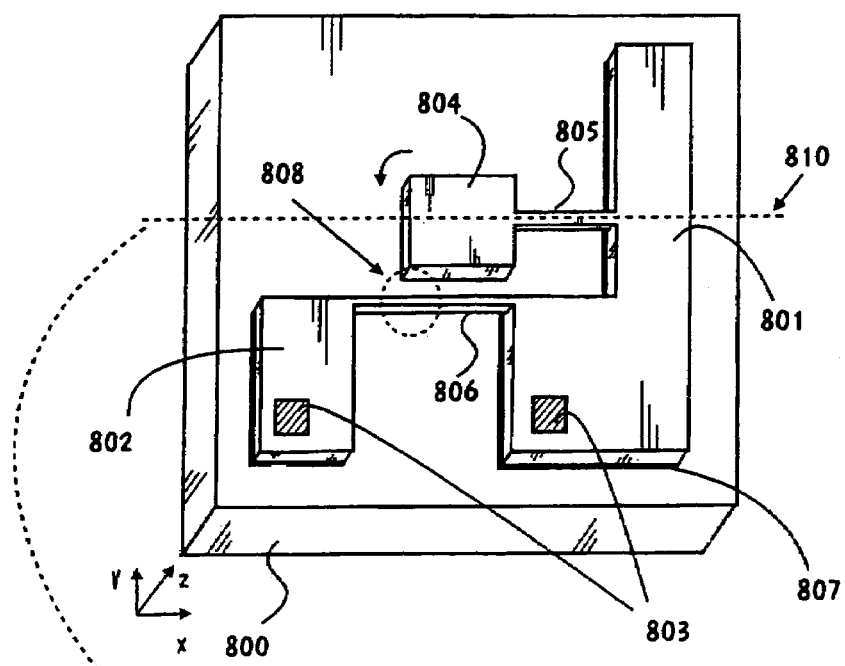

FIG. 8b illustrates the same SOI after removal of material (i.e. part of layers 807 and 809) by the dry etching technique. The pattern created is multiform comprising two areas 801 and 802 rising from the silicon substrate 800, an inertial mass 804 essentially apart from the said silicon substrate, a tiny cantilever beam 805 with one end connected to the inertial mass and the other end to the area 801, and a bridge 806 including a conductive material and connecting the said areas. The silicon oxide layer is otherwise removed throughout the SOI but left under the areas 801 and 802.

The inertial mass is at a distance from the bridge with no obstacles between them, so that when the sensor is sufficiently accelerated the inertial mass operates as a hammer breaking the bridge 806. The breaking point 808 is shown with a dotted circle in FIG. 8b. Break down of the bridge is easily discovered when electrical conductivity is measured through two terminals 803, one of which is on area 801 and the other on area 802.

Figure 8C:
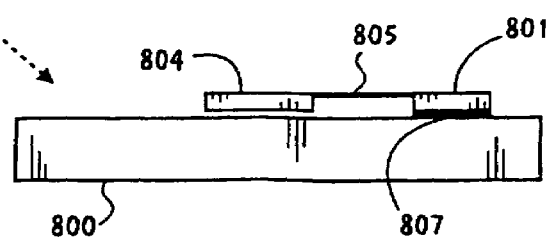

FIG. 8c shows a cross section of the structure in FIG. 8b as seen in the y-direction from the dotted line 810. In this figure it is easily seen that both the inertial mass 804 and the cantilever beam 805 are apart from the silicon substrate 800.

Figure 9:
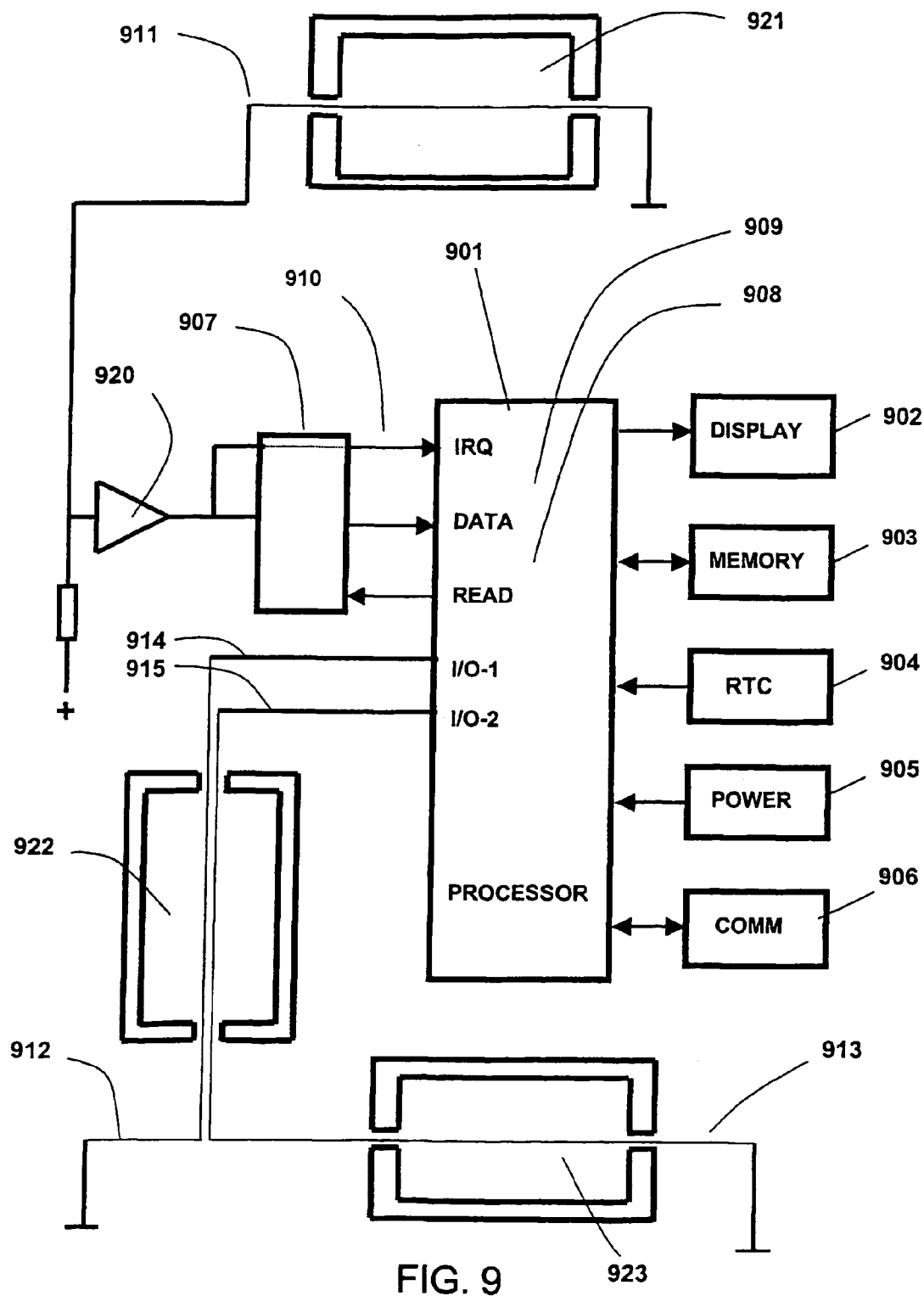
FIG. 9 illustrates the reading of sensor loops, FIG. 10 exemplifies remote sensing using RF resonance circuits.

FIG. 9 shows a typical embedded computer system comprising a processor 901, a display 902, a memory 903, a real-time clock 904, a signaling means 905 for signaling power-up and/or power-down to the processor, and data exchanging means 906. At least a part of the memory 903 is nonvolatile, and another part is reserved for instructions that the processor executes.

The example system according to FIG. 9, which is arranged to measure acceleration sensor fuse loops, comprises a first loop 911 functionally connected through a first acceleration sensor 921 to the processor 901, a registering means 907 for registering signals received from the first loop, a reading means 908 for reading data 909 from the registering means, and an interrupting means 910 for interrupting the normal execution of said instructions of a stored program in said memory 903.

The first loop 911 is advantageously buffered by a buffer 920 before said loop is latched in the register 907. This register is typically reset when data 909 is read by the reading means 908.

In an alternative embodiment the buffer 920 as well as the registering means 907 can be omitted, whereby the signal from the first loop is directly connected to the processor. Such connection is also shown for two additional loops, i.e. a second loop 912 and a third loop 913. The second loop is functionally connected through a second acceleration sensor 922 to the processor 901. Similarly the third loop is functionally connected to the processor by looping the third loop through both a third acceleration sensor 923 and sensor 922. The acceleration sensors are of the kind described above, for example.

Breakage of the 911 loop is reported by an interrupt request signal 910. Alternatively the loop is interrogated periodically by polling. Polling is advantageously used at power up and power down.

The status of the various loops, such as loops 911, 912, and 913 in FIG. 9, are advantageously determined by polling during a self-test procedure at power up and at power down.

The present status is time-stamped and registered in the memory using time information from the real-time clock 904.

Typically only the last two time-stamped power-down and power-up status events are registered in the non-volatile memory for each loop, and each time-stamped data overwrites the previously registered time-stamped data if the result of the self-test is the same as previously. Thus, no memory space is wasted unnecessarily, but any acceleration event causing a loop to break will have its identity time-stamped with either the exact break time or be time framed by two time-stamps. These time-stamps are the power-down event before the break and the power-up event later when a loop break is discovered, for example, by polling during the power-on self-test procedure that checks the status of the various loops.

The program running in the processor can inform the user about a acceleration event and its implication using the display 902, but this is dependent on the application and whether a display is available.

The resistance of the various loops can be measured using an internal Analog to Digital Converter (ADC) in the processor 901, or some other system resource, and the measured value is compared with a previously registered value. If the change exceeds a predetermined minimum value, the result is time stamped and registered. Advantageously only a voltage level is used to indicate the status of a loop, and a binary change will cause that the result is time stamped and registered.

In arranging suitable test points, the resistance of the various loops can also be measured by field maintenance using a suitable Volt-Ohm-Meter (VOM). This is advantageous if the processor has ceased function.

In some cases, especially when multiple acceleration sensors are used, it might be advantageous to use two parallel breakable paths, hereafter called fuses, through an acceleration sensor, as shown with acceleration sensor 922 in FIG. 9.

Generally the use of parallel fuses minimizes interaction between various readout methods. For example, one serial loop can be connected to a digital input port of the processor and other breakable fuses can be connected in parallel before connected to an analogue input port. If each of these parallel loops has a resistor in a series with a fuse, the value of the resistor having been selected from a binary sequence, it is possible to determine exactly which of 32 sensors, for example, are broken and which are not. If each of the paralleled fuses has a resistor serially inserted, selected in binary sequence by conductance, it is possible to determine from the resulting resistance which of the fuses are broken and which fuses remain intact. The resistance value can even be read with a simple multimeter if suitable contact pads have been arranged to facilitate measuring. Even with standard 2% resistors, it is possible to determine, for example, exactly which of 32 sensors are broken and which are not.

It is advantageous to have at least one loop that can be read even if the processor 901 is non-operative, due to lack of power, for example. Parallel breakable fuses can thus advantageously be used when it is desired that some of the loops are to be remotely readable. This technique is described later in more detail.

Instead of having multiple breakable fuses, additional simple combinatorial logic in the registering means 907 can be used to determine if a broken fuse belongs to a set of fuses that causes a warning or to a set of fuses that will indicate that the warranty has been forfeited.

Because the invented sensors are sensitive in multiple planes, insensitive only in the direction of the fuse shaft, very few sensors are needed to give multidirectional shock coverage. In FIG. 9 the sensors 922 and 923 are shown in a 90-degree relative position. This gives a good multi-angle coverage, but using three sensors in a delta or Y configuration, is optimal for practical directional insensitivity.

Generally the deflection of the inertial mass in an acceleration sensor depends both on the acceleration and the mechanical self-resonance of the inertial mass structure. Even small amplitude vibrations occurring at the self-resonance frequency of the system will cause large deflections that will break the cantilever beam. This must be taken into account when the system is designed.

The amplitude of environmental vibrations with a frequency over a few kilohertz, occurring for example in various vehicles, is however insignificant compared to the shock accelerations the invented accelerometers are designed to detect. The self-resonance frequency for the invented sensors is in the high kilohertz range, typically 6 kHz.

Figure 10:
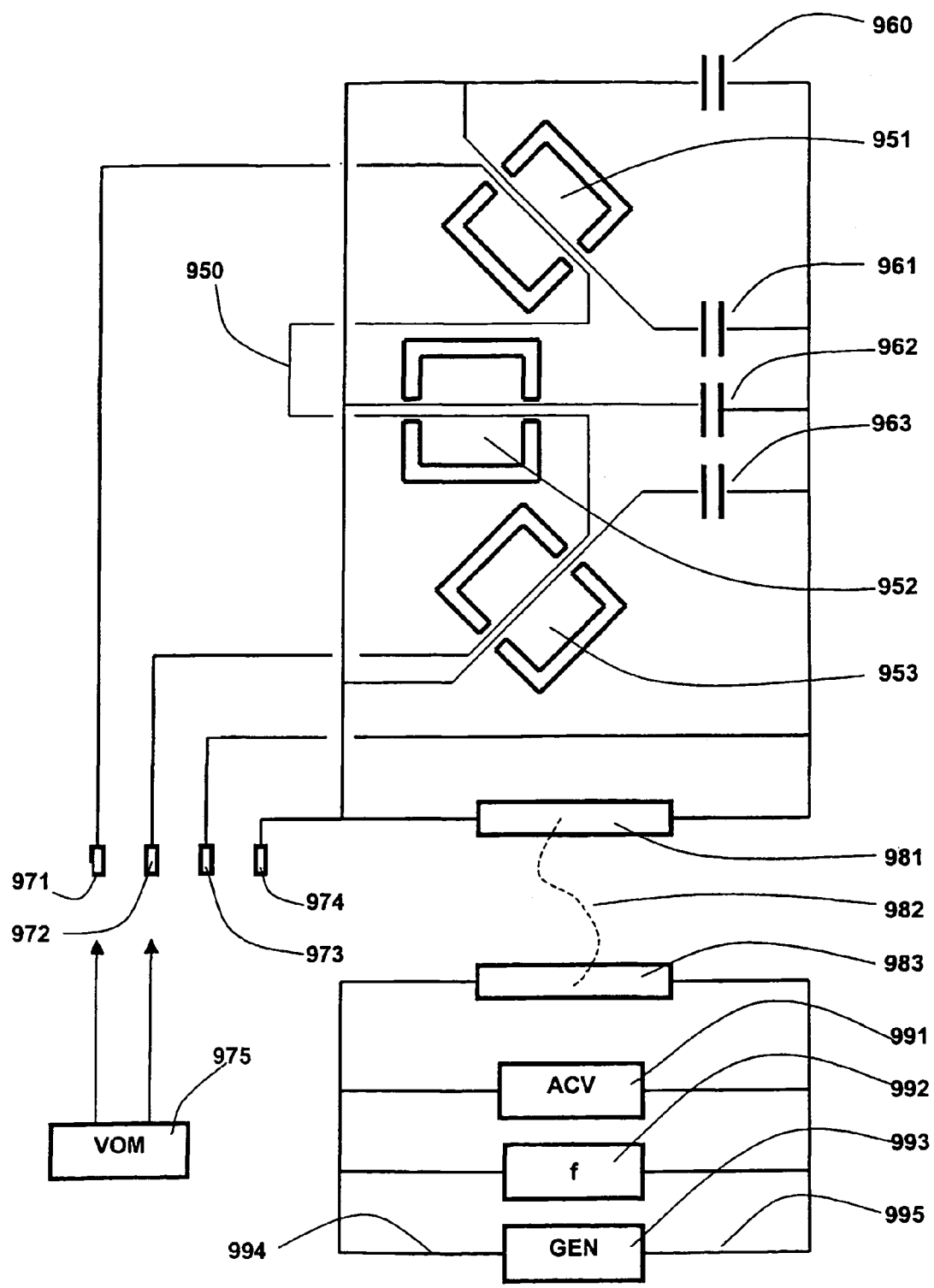

FIG. 10 exemplifies remote sensing using RF resonance circuits. In FIG. 10 each of the breakable fuses 951, 952, and 953 are double fuses. One of the double fuses is used to form a serially connected self-test loop 50. This loop is functionally connected to the processor 901 and can be read by a processor 901 as previously described.

The remaining three fuses of the double fuses are each separately serially connected with a capacitor 961, 962 and 963 as well as connected in parallel amongst themselves and with a capacitor 960 and an inductive loop 981. If no fuse is broken, all four capacitors 960, 961, 962, and 963 are paralleled and with the inductance of the inductive loop 981 form a resonance circuit. If any of the capacitors 961, 962, and 963 are switched out of the resonance circuit, typically when a corresponding fuse is broken, the resonance frequency of the resonance circuit, now formed by the inductive loop 981 and the capacitor 960 paralleled with the remaining sensor capacitors, will increase. If the capacitors 961, 962, and 963 are selected from a suitable sequence, the resonance frequency of each combination of broken and unbroken fuses will be different.

It is advantageous to include the capacitor 960 because it will guarantee a measurable output frequency even if all fusible links are broken. Otherwise, in the case when all fuses are broken, doubt would remain whether the measurement method itself is working.

The said resonance frequency can be remotely read if the resonance circuit is activated from outside. This is the preferred method when the equipment is brought in for warranty repairs, because the status of the breakable fuses, or at least those directly affecting warranty, can be determined even without opening the equipment. If the equipment is opened, an alternative method is to measure the resistance of the loop 950 using an external VOM (Volt Ohm Meter) 975 connected to the ports 971 and 972, arranged to be accessible. The drawback is that exactly which the fuse in the loop was broken cannot be determined, but in most cases this is not necessary.

When activating the said resonance circuit from the outside, a substantially similar inductive loop 983 is brought into range 982 of the internal inductive loop 981. The inductive loop 983 is functionally connected either to a swept oscillator 993, a noise source 993, or a pulse generator 993. The simplest way to measure the resonance frequency of the resonance circuit that includes the inductance loop 981 is to sweep through the possible frequency range and observe the AC voltmeter 991 for resonance peaks occurring at a certain frequency, as indicated by the frequency analyzer 992, or by any frequency meter. If the frequencies corresponding to all combinations of broken fuses are listed beforehand by the equipment manufacturer, it is a simple matter for field maintenance to determine which fuse or fuses are broken.

A more advanced method is to use a noise or pulse generator instead of the sweeping generator 993. The resonance frequencies can then directly be observed on a frequency analyzer 992, and the broken fuses can be determined using the same list as before. If the ports 973 and 974 are accessible, the inductive loop 983 is not even necessary; because the ports 994 and 995 of the activating generator 993 can be directly connected to the ports 973 and 974, of the resonance circuit.

FIG. 11*a-b* is an example of an acceleration sensor processed using both bulk-micro-mechanic and surface micro-mechanic techniques. The processing can be carried out using a Silicon On Insulator wafer (as in FIG. 11*a-b*), but also conventional silicon wafer can come into question.

FIG. 11*a* is a cross-section view of an acceleration sensor processed on a Silicon On Insulator wafer. A cubical silicon inertial mass 1100 is interconnected to a frame 1101 by the polysilicon conductor making the inertial mass integral with the frame. Said conductor covers also a part of the surface of the inertial mass and a part of the said frame. An insulator layer 1103 isolates the polysilicon conductor from the silicon frame. Two metal pads are processed on the polysilicon conductor. The acceleration sensor is connected to a reading electronic part by these pads.

FIG. 11*b* is the same acceleration sensor as seen from above, i.e. from the direction which is perpendicular to the surface of polysilicon conductor.

When acceleration applied to the acceleration sensor exceeds a predetermined threshold level, the polysilicon conductor breaks at points 1102, shown with dotted circles in FIGS. 11*a* and 11*b*. The pads are located on the polysilicon conductor in such a way that the breaking points are between them, so that electrical conductivity or non-conductivity between the pads indicates that the interconnection between the inertial mass and the frame is unbroken or broken.

FIG. 12 shows in a side view a sensor system. Such sensor system can be a stand-alone module, a multichip module (MCM) or a integrated circuit in the form of a System on a Chip (SoC).

Figure 12A:
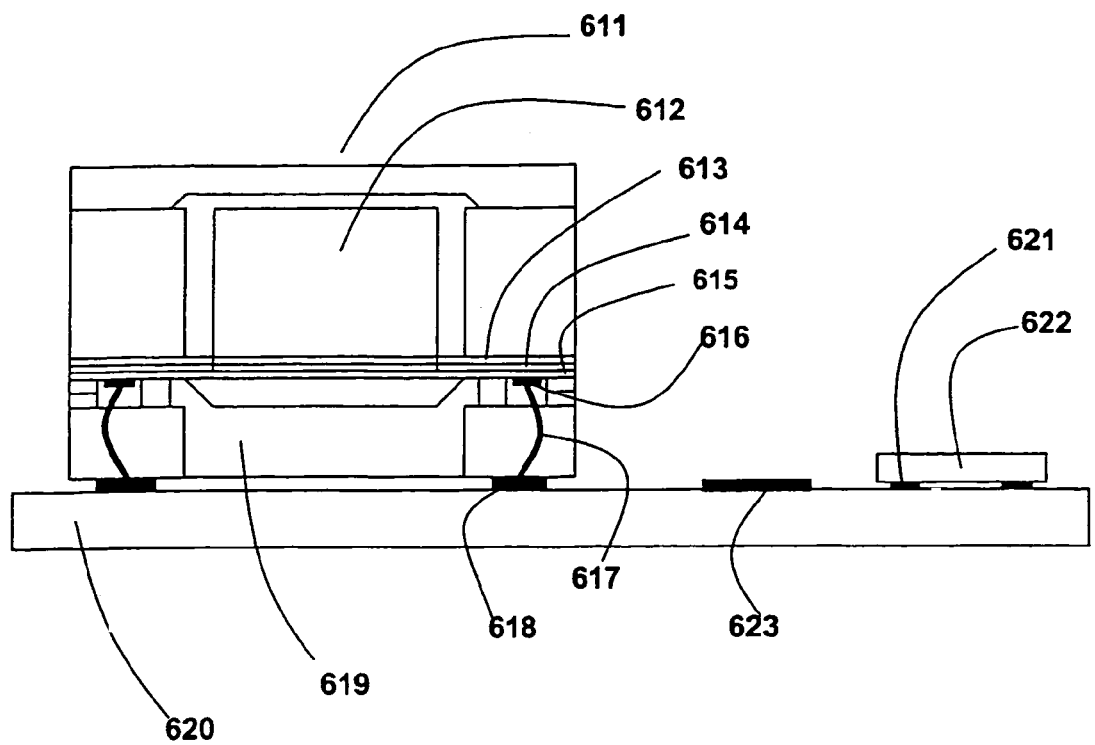
FIG. 12a-b illustrates an acceleration sensor system on a substrate.

FIG. 12*a* exemplifies the sensor system 611 on a substrate 620. The inertial mass is shown as 612. The insulator layer 613 isolates the metal layer 615 that forms the breakable fuse on top of the cantilever beam 614. The fuse is connected through the pads 616, bonding wire 617 and pads 618 to the substrate and using conductive tracks from the pads 618 to the pads 621 of the measuring and registering circuitry 611. This circuitry can either be a standalone system or be part of a host system. Any needed serial or parallel communications bus can be formed using additional pads. The pads 623 on the substrate allow direct measuring using a VOM meter.

Figure 12B:
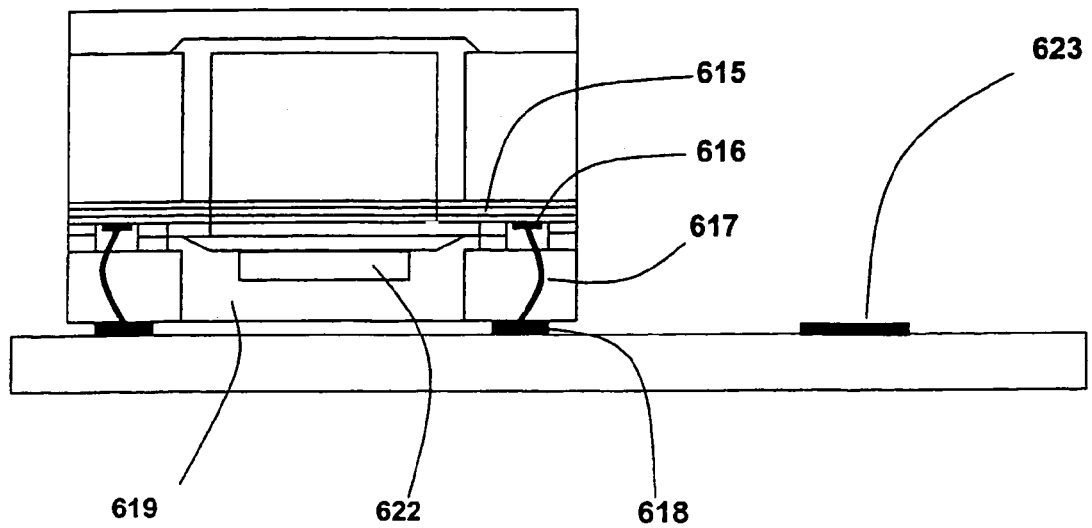

FIG. 12*b* exemplifies when the measuring circuitry 622 is contained in the sensor itself. The measuring circuitry is now contained in the area 622 of FIG. 12*b*. This is the corresponding area to the previously discussed circuitry area 505 in FIG. 5. The pads 618 can be used to arrange a suitable parallel or serial communications bus, and loops can be brought out through additional pads to measurements pads 613. The inductive loop 981 can in the same way advantageously be arranged as tracks on the substrate 620 if the dimensions are such that it is impractical to arrange it in the sensor system 611.

Several sensors having different inertial threshold value can be placed in a product or device. For example, one of the sensors may have lower threshold value (e.g. 100 g) than the others so that it gives forewarning to the user to handle the device more carefully. However, even when the device has already broken, it can indicate to the user or to the repairman when and in what way breakage came about. Information about breakage such as time and amount of acceleration is stored in a non-volatile register. If the breakage is so severe that it prevents any normal usage of the device, the status of the fuses can be read passively instead. After repair, it might be possible to recover more information about the breakage.

Although the invention was described above with reference to the examples shown in the appended drawings, it is obvious to the professional that the invention can be changed within the scope of the inventive idea presented above and in the appended claims. For example, the sensor and the reading method of the sensor fuses are suitable to be used in all kinds of products, especially electrical equipment such as mobile phones, microphones, and electronic books. The acceleration sensor can be used to inform a customer that a product has suffered an acceleration shock and ask that the product be checked in a repair shop. The sensor can also warn the user that the product has been subjected to an acceleration shock close to the warranty limit. More positively, it can testify that the equipment did not suffer any acceleration shock when in temporary use by somebody else.

Other applications are found in the logistic chain: tracing the mishandling of packages and containers, courier services, etc., as well as guaranteeing that the customer is receiving a faultless device.

Because the invented acceleration sensor can be built on any substrate suitable for MEMS, they can be integrated with other electronics and need not even be separate devices.

The inherent repeatability and possibility of measuring acceleration in any direction makes the invented acceleration sensors suitable for customization. They can be built to be sensitive in the directions relevant to any piece of equipment.

Typically the invented sensors can be used in flip chip or Ball Grid Array (BGA) packages, and in other LGA (Land Grid Array) packages that through surface mounting guarantee good mechanical coupling to the object to be observed. But when the invented sensors are part of a larger circuit, the sensors use the existing interconnection technique.

The above-mentioned conductive material can alternatively be unbreakable, but built into the structure in such a way that no electric current can be observed when the sensor is broken. For example, the detecting means comprises conductive path, strip, wire, doped-silicon, or polycrystalline silicon at least on the interconnecting element.

What is claimed is:

1. An apparatus comprising a group of at least two acceleration sensors arranged on one carrier;

wherein each acceleration sensor comprises a first body portion, a second body portion, and a breakable interconnecting element, constructed to break at a determine rupture point, said interconnecting element making the first body portion integral with the second body portion and a detector arranged for giving an indication when the breakable interconnecting element of the sensor is ruptured;

and wherein at least two of the sensors are oriented differently from one another, such that a first sensor is more sensitive than a second sensor to a force in a first direction, and the second sensor is more sensitive than the first sensor to a force in a second direction different to the first direction.

2. The apparatus as in claim 1, Wherein the group comprises acceleration sensors responding to forces in at least three different directions.

3. The apparatus as in claim 1, wherein the detector comprises a conductive path, strip, or wire arranged at least on the interconnecting element.

4. The apparatus as in claim 3, wherein the interconnecting element is adapted to break when an external force affecting the second body portion of one of said at least two acceleration sensor exceeds a predetermined threshold level, wherein a break of the interconnecting element causes a break in the conductive path, strip, or layer.

5. The apparatus as in claim 1, wherein the detector comprises a conductive doped-silicon or polycrystalline silicon layer at least on the interconnecting element.

6. The apparatus, as in claim 1, wherein the detector comprises a conductive, path, strip or wire arranged at a distance from the second body portion, wherein the second body of the acceleration sensors moves and breaks the path, strip, or wire when an external force affecting the second body portion exceeds a predetermined threshold level.

7. The apparatus as in claim 1, wherein the detector forms a part of an electrical detection loop.

8. The apparatus as in claim 1, wherein the indication is stored in a memory.

9. The apparatus as in claim 1, wherein the indication is remotely readable.

10. The apparatus as in claim 1, wherein the at least two acceleration sensors is are produced by micromachining technology using a surface mountable brittle material.

11. The apparatus as is claim 10, wherein the brittle material is single-crystal silicon.

12. The apparatus as in claim 10, wherein the brittle material is polycrystalline silicon.

13. The apparatus as in any claim 10, wherein the indication contains at least information identifying a detecting loop broken by an external acceleration force.

14. The apparatus as in claim 13, wherein the indication further contains the time when the indication was given.

15. The apparatus as in claim 1, wherein the status of the acceleration sensor group is readable immediately or from the memory.

16. The apparatus as in claim 15, wherein at least one of the acceleration sensors in the group is adapted to give a warning to the user when an external force affecting the second body portion exceeds a predetermined threshold level.

17. The apparatus as in claim 1, wherein all sensors of the group are integrated in a single block.

18. The apparatus as in claim 1, wherein an acceleration of any of the sensors of the group is remotely identifiable.

19. The apparatus as in claim 18, wherein all sensors of the group are integrated in a single block and the single block further comprises means for storing indications containing at least the time when the indication was given and the identity of the detector.

20. The apparatus as in claim 1, wherein all sensors of the group are integrated in a single block and the single block further comprises means for storing indications containing at least the time when the indication was given and the identity of the detector.

21. The apparatus as in claim 1, wherein all sensors of the group are integrated in a multichip module together with means for storing indications containing at least the time when the indication was given and the identity of the detector.

22. The apparatus as in claim 1, wherein all sensors of the group are integrated in an integrated circuit together with means for storing indications containing at least the time when the indication was given and the identity of the detector.

23. A handheld terminal, comprising
an acceleration sensor arrangement comprising a group of at least two acceleration sensors;
wherein each acceleration sensor comprises a first body portion, a second body portion, an interconnecting element making the first body integral with the second body, and a detector means arranged for giving an indication when a breakable component of the sensor is ruptured and further giving an indication to a user of the handheld terminal of rupture of the breakable component;
and wherein at least two of the sensors are oriented differently from one another, such that a first sensor is more sensitive than a second sensor to a force in a first direction, and the second sensor is more sensitive than the first sensor to a force in a second direction different to the first direction.

24. The handheld terminal as in claim 23, wherein the acceleration sensor arrangement is arranged to indicate to the handheld terminal when an acceleration sensor of the arrangement exceeds a predetermined threshold level and to give a warning to a user of the terminal if said indication is active when the terminal is switched on.

25. A method comprising:
giving an indication when a breakable component of at least one acceleration sensor of an acceleration arrangement is ruptured;
wherein the acceleration sensor arrangement comprises a group of at least two acceleration sensors, each acceleration sensor comprising a first body portion, a second body portion, and a breakable interconnecting element, constructed to break at a predetermined rupture point, said interconnecting element making the first body portion integral with the second body portion and a detector arrangement for giving the indication when the breakable interconnecting element of the sensor is ruptured;
and wherein at least two of the sensors are oriented differently from one another, such that a first sensor is more sensitive than a second sensor to a force in a first direction, and the second sensor is more sensitive than the first sensor to a force in a second direction different to the first direction.

26. The method of claim 25, further comprising registering in a non-volatile memory a status of the breakable component of each sensor.

27. A method as in claim 26, comprising registering the status of the breakable component at power-up and power-down events of a device comprising the acceleration sensor arrangement.

28. A method as in claim 27, comprising storing time-stamped data in the non-volatile memory indicating the status of the breakable component at the two most recent power-up and power-down events.

29. A method as in claim 28, comprising overwriting previous time-stamped data indicative of a previous event, if a current status of the breakable component is unchanged compared to a previous status indicated by the previous time-stamped data.

* * * * *